Oct. 25, 1938.  F. W. BURGIE ET AL  2,134,071
SAFETY DEVICE FOR POWER PRESSES
Filed May 18, 1937
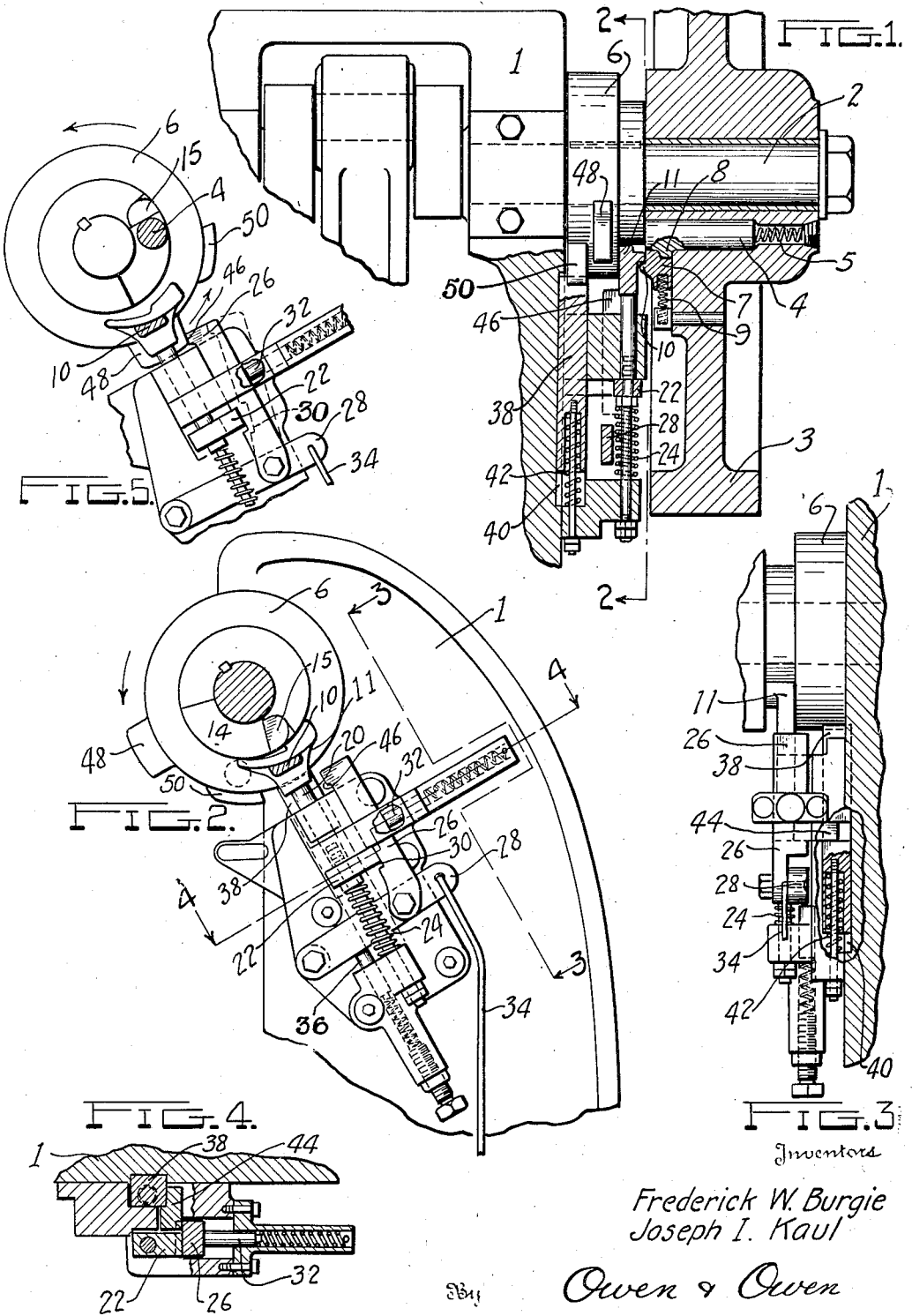
Inventors
Frederick W. Burgie
Joseph I. Kaul
By Owen & Owen
Attorneys Patented Oct. 25, 1938

2,134,071

UNITED STATES PATENT OFFICE 2,134,071

SAFETY DEVICE FOR POWER PRESSES

Frederick W. Burgie and Joseph I. Kaul, Toledo, Ohio, assignors to Doehler Die Casting Company, Toledo, Ohio, a corporation of New York Application May 18, 1937, Serial No. 143,349

9 Claims. (Cl. 192—25)

This invention relates to a safety device for power presses, and is particularly directed to a safety device usable with a clutch of the sliding pin type to limit the engagement cycle of the clutch.

It is desirable in carrying out certain punching and stamping operations on power presses to limit the press to a single stroke so that new work may be placed in the path of the slide of the press after each operating stroke of the plunger.

The usual cycle of operation, so far as the operator is concerned, consists in placing a blank in position, starting the press by means of a treadle or trip handles, and removing the completed work after the slide of the press has performed its down stroke, and moved up away from the blank. Occasionally in production operations, the operator so times his movements that his hands move under the slide of the press to pick up the completed blank during the up stroke of the press slide. A press used in this character of work is equipped with devices to prevent "repeating" or preventing the press from performing more than one stroke for each actuation of the treadle or trip handles. If the press repeats, the operator is in serious danger of being injured by reason of the fact that his hands may be in position to be struck by the next accidental down stroke of the press.

Numerous devices have been suggested to prevent repeated strokes of the press and in this way to prevent injury to the operator. Most of these have taken the form of means to disengage the clutch elements by which the shaft of the press derives power from the fly wheel. It has been found in practice that, when certain types of clutches are used, such as a sliding pin clutch, the clutch pin occasionally breaks or other of the mechanism becomes so damaged that the means intended to disengage the clutch pin fails to function and the press repeats.

The primary object of the present invention is the provision of a positive means to prevent unintended successive strokes of a power press.

Another object of the invention is the provision of a simple and efficient means to interlock a positive stopping means to a device to return clutch parts to non-engaging position. Still another object of the invention is the provision of a device of the above character which is readily installed and which requires a minimum of attention and servicing after installation.

Other objects and advantages of the invention will become apparent as the description proceeds, reference being had to the accompanying drawing, in which—

Figure 1 is a fragmentary front view, with parts in section, of the fly wheel side of a press on which the present invention is installed; Fig. 2 is a section on line 2—2 of Fig. 1; Fig. 3 is a section on line 3—3 of Fig. 2, with a part broken away; Fig. 4 is a section on line 4—4 of Fig. 2, and Fig. 5 is a fragmentary view, similar to Fig. 2, with the parts in another operating position.

Referring to the drawing, 1 designates a press having a crank shaft 2 which extends beyond the side frame of the press in the usual manner. A drive wheel 3 is mounted for free rotating movements on the end of the shaft and is driven from any suitable source of power.

The present invention is shown as applied to a clutch of the sliding pin type which includes a clutch pin 4 mounted in the hub of the drive wheel 3 and adapted to slide in and out of its mounting socket. A clutch pin spring 5 urges the clutch pin out of the wheel against a clutch collar 6 fixed to the crank shaft 2. The clutch pin is retained in place in the wheel by a radially sliding trip block 7 mounted in a slot in the face of the wheel and adapted to engage a dog 8 formed on the clutch pin. A spring 9 urges the block to latching position in engagement with the dog 8. The trip block 7 is further provided with a shoulder 10 which engages a throw-out or operating head 11.

The clutch collar 6 is provided in its face with a recessed area 14 (Fig. 2) and carries a drive pin 15 at the driving side of the recess, which latter takes the driving force by engagement with the clutch pin 4. As the drive pin 15 is the driven member which wears most readily, it is made easily replaceable.

The throw-out head 11 is of the customary type, being provided with two cam surfaces, one of which is formed on the lower surface of the head to cam the sliding block 7 out of latching engagement with the clutch pin, and the second of which is formed on the side of the head facing the fly wheel to force the sliding pin 4 back into the drive wheel where it is held by the sliding block 7 until the latter is again lowered by the throw-out for another cycle of operation.

As above noted, clutches of the character described occasionally fail to operate properly when intended to drive the press for a single revolution. Repeating may be due to any of a number of causes, such as failure of the sliding block spring 9, or breaking or jamming of the clutch pin itself. The present invention is intended primarily to obviate the dangerous results attendant to such failures and to prevent repeating of the press under any circumstances.

The throw-out head 11 is connected to a throw-out rod 20 which carries a bracket 22 extending laterally therefrom. The head is urged into position against the drive collar 6 by a suitable spring 24, and is moved down to start the press by actuation of a latch arm 26 which is pivoted to a lever 28. The latch arm 26 has a recess 30 intermediate its ends which engages over the bracket 22, and the arm is urged into engaging position by a spring pressed pin 32. Lever 28 is pivoted at one end and is connected at its other end to a pull rod 34 which is actuated by the trip handles or by any suitable mechanism by which the operator starts the press. The lever is urged to its upper position in which the latch arm may function by a spring pressed pin 36.

A positive stop key 38 is fitted to slide in a groove 40 in the side frame of the press radially of the collar 6, and is urged against said collar by an independent spring 42. As shown in Fig. 4, the latch arm 26 is considerably wider than the bracket 22 carried by the throw-out rod 20, so that it acts as an interlock by engaging a bracket 44 carried by the positive stop key 38. Thus, when the latch arm is pulled down in response to a movement of the pull rod 34, not only does the throw-out head 11 move down, but by reason of its interlock with the latch arm, the positive stop key 38 is also moved down.

The upper end of the latch arm 26 is provided with a striker surface 46 in the path of rotation of a striker lug 48 fixed to the periphery of the clutch collar 6. As will be seen in Fig. 5, the lug 48 strikes against the upper end of the latch arm 26 and moves it about its pivoted lower end so that it releases engagement with both bracket 22 carried by the throw-out and bracket 44 carried by the positive stop key 38. This movement is indicated in the dotted line position of the latch arm in Fig. 5. The throw-out and positive stop key will each be returned against the clutch collar by their respective springs 24 and 42.

A stop lug 50 is fixed to the periphery of the clutch collar 6 as by welding, and is disposed so that the positive stop key 38, when in normal position, is in its path of rotation. It will be seen from Figs. 2 and 5 that this lug has its leading edge spaced slightly behind the drive pin 15 and hence back of the clutch pin 4 so that the latter should be cammed back into the drive wheel and the press stopped before the lug 50 is carried around sufficiently to engage the positive stop key. Obviously, the angular disposition of the lug 50 will be varied to suit the amount of carry-over present in a particular type of press, which depends on the rapidity with which the press brake sets and stops the crank shaft.

Being in the path of rotation of the lug 50, the positive stop key 38 will prevent rotation of the drive collar and crank shaft should anything happen which would otherwise permit the press to repeat. It will be seen that the lug 50 clears the stop key at the start of the press stroke, since the key is pulled down by the latch arm 26 far enough for the lug to pass, but will strike against it on the next rotation of the drive collar, since the positive stop key has been forced back to its upper position by the spring 42 as soon as the latch 26 is tripped by the striker lug 48. The striker lug 50 and its associated positive stop key 38 are made considerably stronger than the remaining parts, particularly the key which holds the clutch collar 6 on the crank shaft so that no failure of these parts is apt to occur.

While the present positive stop has been shown as a key 38 fitted into the side frame of the press, it will be appreciated that any member having sufficient strength and rigidity to take the blow to which it is subjected in stopping lug 50 and the crank shaft of the press, will suffice.

A brief summary of the operation is as follows:

To start a cycle of operations of the press, the operator causes pull rod 34 to move down, pulling latch arm 26 along with it. Latch arm 26 is interlocked by means of its recess 30 with the throw-out head and the positive stop key so that both of these members move down with it. Throw-out head 11 cams the sliding block 7 downwardly when this member comes around in its rotation with the drive wheel. This releases the clutch pin 4 which slides out of the drive wheel to enter the recess 14 in the clutch collar 6 and abut against the drive pin 15. Thus, the clutch collar carried by the crank shaft of the press and the drive wheel will rotate together. Rotation of the clutch collar brings the striker lug 48 against the upper end of the latch arm 26, moving the latter ahead of it and causing brackets 22 and 44 to be released from engagement in the recess 30 of the latch arm. The throw-out head 11 and positive stop key 38, when thus released, are each returned independently to normal position by their respective springs. When the crank shaft has completed a single revolution, the throw-out head 11 cams the drive pin 4 back into the drive wheel and the press brake brings the shaft to rest. Any failure of the parts to accomplish their intended action causes the clutch collar 6 to start another revolution and immediately brings the lug 50 against the positive stop key 38. This will act to stop the press, even though driving connection with the source of power is maintained through the clutch pin.

While the invention has been described in connection with a particular type of clutch and with a particular form and disposition of the parts, it should be readily appreciated that it is adaptable to other clutches, and that numerous changes will suggest themselves to those skilled in the art. The present invention properly includes all such changes which fall within the scope of the appended claims.

Having thus described our invention, what we claim as new, and desire to secure by United States Letters Patent, is:

1. In a clutch control device, a frame, a rotatable shaft mounted on said frame having a clutch member and a stop shoulder thereon, a drive member loose on the shaft, a second clutch member movably carried by said drive member and adapted to be projected into driving engagement with said first named clutch member, trip means carried by the drive member and normally acting on said second clutch member to retain it in released position, throw-out means normally standing in coacting relation to said second clutch member and operable to release said trip means when moved from such position, a positive stop element independent of said throw-out means normally standing in the path of revolution of said stop shoulder, and movable control means connected to said frame and having releasable engagement with both said throw-out means and stop element and operable to move said latter means and element to released positions with respect to said second clutch means and stop shoulder, and means automatically operable at a predetermined point in a rotation of said clutch member to release said control means from said throw-out means and stop element to permit return of the latter to normal positions.

2. In a clutch control device, a driven shaft having a fixed clutch part, a drive member loose on said shaft, a movable clutch member carried by said drive member and normally standing in clutch engagement with said clutch part and being retractable from such position, means movable with said driven shaft and forming a positive stop shoulder, trip means carried by said drive member and normally acting on the movable clutch member to retain it in retracted position, throw-out means normally standing in clutch member throw-out position and operable to release said trip means when moved from such position, a positive stop element entirely independent of said throw-out means normally standing in the path of movement of said stop shoulder, control means having releasable engagement with each of said control means and stop element to retract them from normal position when the control means is operated, and means including an element movable with said driven shaft and operable to release said control means from said throw-out means and stop element at a predetermined point in its movement.

3. In a clutch control device, a rotatable shaft, a clutch collar and a stop shoulder fixed to said shaft, a drive member loose on said shaft, movable clutch means carried by the drive member and adapted to be moved into clutch engagement with said collar, trip means for retaining said movable clutch member in released position, throw-out means for said movable clutch means normally standing in clutch throw-out position and operable, when moved from such position to release said trip means, a positive stop element entirely independent of the throw-out means and movable into and out of the path of movement of said stop shoulder, yielding means normally retaining said stop element in the path of movement of said shoulder, a control means having a trip member in releasable engagement with each of said throw-out means and stop element and operable to move said last means and element from normal positions whereby to release the clutch means and permit rotation of said shaft, and means carried by said shaft and automatically operable to coact with said control means and release its engagement with said throw-out means and stop element at a predetermined point in a rotation of the shaft.

4. In a clutch control device, a shaft, a drive member loose on said shaft, cooperating clutch elements, one carried by said drive member and the other by the shaft and normally engageable, throw-out means normally standing in clutch throw-out position and operable to permit engagement of the clutch when moved from such position, means movable with the shaft and forming a stop shoulder, a stop element entirely independent of the throw-out means and movable into and out of the path of movement of said shoulder, means acting on said element to normally hold it in stop relation to said shoulder, manually operable control means having releasable engagement with both of said throw-out means and stop element and operable to move both said means and element from normal positions and retaining engagement therewith, and means carried by the shaft and operable at a predetermined point in the movement thereof to coact with said control means and disengage it from said throw-out means and stop element.

5. In a clutch control device, a shaft, a drive member loose on said shaft, releasable clutch means between said drive member and shaft, trip means operable to disengage the clutch members and normally retain them in disengaged relation, a part movable with said shaft and forming a stop shoulder, a stop element independent of said strip means and movable into and out of the path of movement of said shoulder, means normally retaining said element in stop coacting relation with said shoulder, a control means having releasable trip engagement with each of said trip means and stop element and operable to move both from normal positions to permit engagement of the clutch and movement of said shoulder, and means movable with said shaft and coacting with said control means to release engagement of the control means with said trip means and stop element at a predetermined point in the movement of the shaft to cause disengaging of the clutch and a positive stopping of the shaft.

6. In a clutch control device, a frame, a driven shaft mounted on said frame and having a clutch collar provided with a stop shoulder, a drive member loose on the shaft, a clutch pin carried by said member and adapted to be projected into driving engagement with said collar, trip means carried by said member and normally acting on the clutch pin to retain it in released position, a throw-out element normally standing in clutch pin throw-out position and operable to release said trip means when moved from such position, a positive stop element independent of said throw-out element normally standing in the path of movement of said stop shoulder, a manually controlled vertically movable lever connected to said frame, a latch pivoted to said lever and normally engaging each of said throw-out and stop elements, whereby to move said elements to their inoperative positions when the lever is swung in a downward direction, and means carried by said collar adapted to actuate said latch and to thereby release the throw-out and stop elements at a predetermined point in the movement of the clutch collar to permit said elements to be returned to their operative positions.

7. In a clutch control device, a shaft, a drive member loose on said shaft, releasable clutch means between said drive member and shaft, trip means operable to disengage the clutch members and normally retain them in disengaged relation, a part movable with said shaft and forming a stop shoulder, a stop element independent of said trip means and movable into and out of the path of movement of said shoulder, means normally retaining said element in stop coacting relation with said shoulder, a control means of a width to have releasable trip engagement with each of said trip means and stop element and operable to move both from normal positions to permit engagement of the clutch and movement of said shoulder, and means movable with said shaft and coacting with said control means to release engagement of the control means with said trip means and stop element at a predetermined point in the movement of the shaft.

8. In a clutch control device, a shaft, a drive member loose on said shaft, releasable clutch means between said drive member and shaft, trip means operable to disengage the clutch members and normally retain them in disengaged relation, a part movable with said shaft and forming a stop shoulder, a stop element independent of said trip means and movable into and out of the path of movement of said shoulder, means normally retaining said element in a stop coacting relation with said shoulder, a control means formed and disposed so as to have releasable trip engagement with each of said trip means and stop element and operable to move both from normal positions to permit engagement of the clutch and movement of said shoulder, and means movable with said shaft and coacting with said control means to release engagement of the control means with said trip means and stop element at a predetermined point in the movement of the shaft.

9. In a clutch control device, a shaft, a drive member loose on said shaft, a releasable clutch means between said drive member and shaft, trip means operable to disengage the clutch members and normally retain them in disengaged relation, a part movable with said shaft and forming a stop shoulder, a stop element independent of said trip means and movable into and out of the path of movement of said shoulder, said trip means and stop element each having a projecting part, means normally retaining said stop element in stop coacting relation with said shoulder, a control means formed and disposed so as to have releasable trip engagement with the projecting parts carried by said trip means and stop element and operable to move both from normal positions to permit engagement of the clutch and movement of said shoulder, and means movable with said shaft and coacting with said control means to release engagement of the control means with said trip means and stop element at a predetermined point in the movement of the shaft.

FREDERICK W. BURGIE.
JOSEPH I. KAUL.